United States Patent [19]

Danner

[11] Patent Number: 5,189,111
[45] Date of Patent: Feb. 23, 1993

[54] AMINOALKYLATED SIDE-CHAINS-CONTAINING VINYLIC COPOLYMERS

[75] Inventor: Bernard Danner, Riedisheim, France

[73] Assignee: Sandoz Ltd., Basel, Switzerland

[21] Appl. No.: 293,256

[22] Filed: Jan. 4, 1989

[30] Foreign Application Priority Data

Jan. 7, 1988 [DE] Fed. Rep. of Germany ..... 38001993

[51] Int. Cl.$^5$ .................. C08F 120/60; C08F 220/34; C08F 20/34
[52] U.S. Cl. ............................ 525/328.2; 525/3274; 525/379; 525/380; 526/260; 526/263; 526/923
[58] Field of Search ..................... 525/379, 380, 328.2, 525/374; 524/140; 526/260, 263, 923

[56] References Cited

U.S. PATENT DOCUMENTS

| | | | |
|---|---|---|---|
| 3,728,319 | 4/1973 | Kiesel .................................. | 260/88.1 |
| 3,766,156 | 10/1973 | Kine et al. ........................... | 260/86.1 |
| 3,980,800 | 9/1976 | Nagy ..................................... | 526/23 |
| 4,116,912 | 9/1978 | Mizuguchi ........................... | 260/29.4 |
| 4,251,410 | 2/1981 | Danner et al. ....................... | 525/380 |
| 4,311,805 | 1/1982 | Moritani et al. ..................... | 525/60 |
| 4,444,971 | 4/1984 | McEntire ........................... | 526/292.2 |
| 4,696,962 | 9/1987 | Danner et al. ....................... | 524/140 |

FOREIGN PATENT DOCUMENTS

| | | |
|---|---|---|
| 156646 | 10/1985 | European Pat. Off. . |
| 187275 | 7/1986 | European Pat. Off. . |
| 52-3622 | 1/1973 | Japan . |

*Primary Examiner*—Paul R. Michl
*Assistant Examiner*—Tae H. Yoon
*Attorney, Agent, or Firm*—Gerald D. Sharkin; Richard E. Vila; Diane E. Furman

[57] ABSTRACT

Water-dilutable side-chain-containing vinylic copolymers comprising groups ($\gamma$) of the formula $$-X-Alk-Y- \qquad (I),$$

wherein

Alk signifies alkylene with 2-6 carbon atoms or hydroxysubstituted alkylene with 3-6 carbon atoms or alkylene with 4-6 carbon atoms, interrupted by —O—, X signifies a basic amino group or an ammonium group and Y signifies a basic —NH-group or an acid adduct thereof, one of X and Y being further bound to an optionally substituted aliphatic or heteroaromatic hydrocarbon radical and the other to hydrogen or an optionally substituted aliphatic hydrocarbon radical, as a constituent of a least some of the side-chains and at least one mole % of the comonomer units constituting the copolymer bearing such ($\gamma$)-containing side-chains - which are obtainable by copolymerization of corresponding co-monomers or by amino-alkylation of corresponding starting polymers - are particularly suitable as precipitating and/or flocculating agents, e.g. for water and back-water clarification and above all for the production of paper.

27 Claims, No Drawings

AMINOALKYLATED SIDE-CHAINS-CONTAINING VINYLIC COPOLYMERS

It has been found that by the use of particular new cationic side-chains-containing vinylic copolymers, as defined below, the treatment of unclean water and aqueous suspensions, in particular of cellulosic pulp suspensions for the production of paper, can be significantly rationalized since even with very small quantities of the specified copolymers there may be achieved an outstanding precipitation or flocculation effect.

The invention relates to the new cationic copolymers, their production and their use and to the corresponding new monomers and their production.

The invention thus provides a cationic, water-dilutable, side-chains-containing vinylic copolymer which is characterized by containing a group ($\gamma$) of the formula $$-X-Alk-Y- \qquad (I),$$

wherein
Alk signifies alkylene with 2–6 carbon atoms, hydroxy-substituted alkylene with 3–6 carbon atoms or alkylene with 4–16 carbon atoms interrupted by oxygen,
X signifies a basic amino group or an ammonium group and
Y signifies a basic —NH—group or an acid adduct thereof,
the one of X and Y being further linked to an optionally substituted aliphatic or hetero-aromatic hydrocarbon radical and the other being further linked to hydrogen or to an optionally substituted aliphatic hydrocarbon radical, as a constituent of at least some of the side-chains, at least 1 mole % of the comonomer-units constituting the copolymer bearing such a ($\gamma$)-containing side-chain.

The copolymers of the invention are cationic, i.e. they are constituted of cationic and optionally non-ionic comonomer-units and are essentially free of anionic and of amphoteric comonomer-units. As cationic are understood herein as well quaternary and protonated ammonium groups and compounds as also basic amino groups and compounds which in aqueous acidic medium can be protonated to ammonium groups resp. compounds.

Where in formula (I) Alk signifies alkylene with 2–6 carbon atoms this may be a di- to hexamethylene or, if it contains 3–6 carbon atoms, it may also be branched, provided that between X and Y there is a distance of at least 2 carbon atoms. Where Alk signifies a hydroxy-substituted alkylene with 3–6 carbon atoms, the hydroxy group is placed at the second or third carbon atom, counted from the closest nitrogen atom; preferably there is only one hydroxy group and the hydroxy-substituted alkylene is, in particular, an alkylene with, 3 or 4 carbon atoms in which the hydroxy group is in 2-position the (in particular 2-hydroxy-propylene-1,3, 2-hydroxy-butylene-1,4 and 2-hydroxy-2-methyl-propylene-1,3). Where Alk signifies $C_{4-6}$-alkylene interrupted by oxygen (preferably by one oxygen), there is advantageously a distance of at least 2 carbon atoms between oxygen and nitrogen; in this case Alk signifies preferably —CH$_2$—CH$_2$—O—CH$_2$—CH$_2$—.

Preferably Alk signifies Alk$_1$, i.e. alkylene with 2–4 carbon atoms, in particular ethylene, propylene-1,2 or -1,3 or butylene-1,2 or -1,4 of which ethylene and propylene-1,3 are particularly preferred.

The symbol X signifies a basic amino group or an ammonium group, i.e. a nitrogen atom which is bound exclusively to one or more aliphatic hydrocarbon radicals and optionally heteroaromatic hydrocarbon radicals and optionally to hydrogen; any carbon atom bound to the nitrogen may, in particular, belong to an alkyl, alkenyl, alkylene or alkenylene radical, any further substitution at these alkyl, alkenyl, alkylene or alkenylene groups being of secondary relevance, so long as the basicity of the amino group is not significantly impaired (where X represents an ammonium group this definition applies to the corresponding non-protonated and non-quaternated form thereof); it is, in particular preferred that these hydrocarbon radicals bear no anionic groups (i.e. acid groups optionally in salt form) as substituents. Optionally X may represent in particular also a nitrogen which is a constituent element of a heterocycle and is optionally quaternated.

The symbol Y represents a basic —NH-group or an acid adduct thereof. It is thus bound besides Alk either to hydrogen or to an aliphatic hydrocarbon radical, analogously as defined above for X.

The radical ($\gamma$) of the formula (I) corresponds to the formula $$-X-Alk-NH- \qquad (Ia)$$

or to an acid adduct thereof, preferably to the formula $$-X-Alk_1-NH- \qquad (Ib),$$

wherein Alk$_1$ signifies $C_{2-4}$-alkylene,
or to an acid adduct thereof.

The radicals —Alk—NH— resp. —Alk$_1$—NH— (in the form of the free base or in protonated form) which are bound to basic, protonated or quaternated amino groups X are introduced mainly by amino alkylation of a corresponding basic optionally protonated amino group of the starting polymer or of the corresponding monomer.

The process for the production of the vinylic copolymers of the invention is characterized by ($\alpha$) amino-alkylating a corresponding cationic vinylic polymer, that contains a basic amino group and/or an acid adduct thereof at the basic optionally protonated nitrogen, to form at least one radical ($\gamma$) or ($\beta$) radically copolymerizing vinylic comonomers (Vm$_1$) that contain at least one group ($\gamma$) of formula (I) optionally together with other vinylic comonomers, which are (Vm$_2$) non-ionic comonomers or (Vm$_3$) cationic comonomers that contain no group ($\gamma$) or mixtures of two or more of such comonomers (Vm$_2$) and (Vm$_3$).

As cationic vinylic polymers containing at least one basic (optionally protonated) amino group—that are suitable as starting polymers in the process alternative ($\alpha$)—come essentially into consideration such bearing side-substituents at the main hydrocarbon chain, at least one side-substituent containing a basic, optionally protonated nitrogen. The basic amino groups may, in particular, be represented by the formula —NAB, in which each of A and B signify hydrogen or an aliphatic, araliphatic or heteroaromatic substituent which is bound to the N-atom through an aliphatic or heteroaromatic carbon atom. The symbols A and B represent each advantageously either hydrogen or a substituent which is $C_{1-4}$-alkyl or A may constitute a part of a hetero-aliphatic ring in which the nitroen bound to A and B is a or the heteroatom, or A and B together with the nitrogen to which they are bound and with the further link may form a heteroaromatic cycle which is bound directly or over a bridge member to the polyvinylic main chain. The starting polymers may in particular be defined as such that are built-up of recurring units of the following formulae

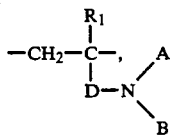 (IIa)

and optionally

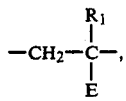 (IIb)

wherein $R_1$ signifies hydrogen or methyl,

D signifies a group that links the basic amino group to the main chain optionally with inclusion of A and optionally B to form a heterocycle and E signifies a non-ionic, preferably polar, substituent the basic amino groups being optionally protonated.

The starting polymers used according to the invention, which in particular comprise the repeating units (IIa)' and optionally (IIb) and preferably consist essentially thereof, are principally (co)polymerisation products of monomers of the (meth)acrylic series, of the (meth)allylic series and/or of the vinyl-substituted heterocyclic series and optionally of the vinyl ether series.

The starting vinylic polymers of process alternative (α) are principally homo- or copolymers of cationic vinylic monomers of the formula

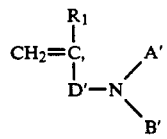 (IIIa)

in which A', B' and D' correspond to the significances of A, B and D respectively or, if they are modified by the radical polymerisation, they correspond to the respective preceding monomeric stage thereof, the basic amino group being optionally protonated, and optionally non-ionic vinylic comonomers of the formula

 (IIIb)

preferably homo- or copolymers of one or more monomers of the following formulae (IV) to (VII)

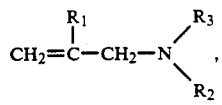 (IV)

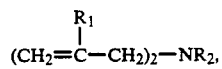 (V)

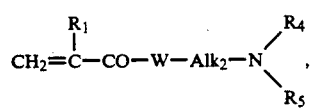 (VI)

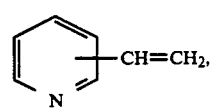 (VII)

which are optionally protonated, or copolymers of one or more of the above monomers of the formulae (IV) to (VII) with at least one non-ionic comonomer of formulae (VIII) to (XI)

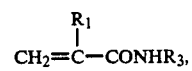 (VIII)

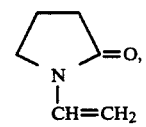 (IX)

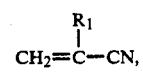 (X)

 (XI)

wherein $R_1$ independently from each other signifies hydrogen or methyl, $R_2$ independently from each other signifies hydrogen, $C_{1-8}$-alkyl or benzyl, $R_3$ independently from each other signifies hydrogen or $C_{1-2}$-alkyl, $R_4$ signifies hydrogen or $C_{1-2}$-alkyl, $R_5$ signifies $C_{1-2}$-alkyl, $R_6$ signifies $C_{1-2}$-alkyl, $Alk_2$ signifies $C_{2-6}$-alkylene or hydroxy-substituted $C_{3-6}$-alkylene and W signifies —O— or —NH—.

Homo- and copolymers of monomers of the formulae (IV) to (VI) in particular (V) and (VI) or especially copolymers thereof with non-ionic comonomers, in particular such of formula (VIII) are preferred among them.

The aminoalkylation of the starting polymers in process alternative (α) is carried out preferably by reaction of the starting polymers with at least one compound of the formula

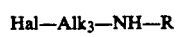 (I'), wherein $Alk_3$ signifies $C_{2-6}$-alkylene or $C_{4-6}$-alkylene interrupted by —O—, Hal signifies halogen, R signifies hydrogen, a hydrocarbon radical with 1-8 carbon atoms which is bound through an aliphatic carbon atom to the NH-group, or a hydrocarbon radical with 4-8 carbon atoms which is interrupted by —O— or —NR'— and R' signifies hydrogen or $C_{1-2}$-alkyl.

Halogen represents preferably chlorine or bromine and is situated preferably in one of the positions $\beta$ to $\omega$ of the $C_{2-6}$-alkylene radical or in $\omega$ of the $C_{4-6}$-alkylene radical interrupted by —O—.

Where R does not signify hydrogen it represents preferably $C_{1-4}$-alkyl, in particular methyl, ethyl, n- or iso-propyl or n-butyl or a radical of the formula

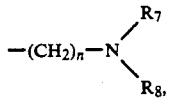 (XII)

wherein $R_7$ and $R_8$ independently from each other signify hydrogen or $C_{1-2}$-alkyl or $R_7$ and $R_8$ together with the N-atom to which they are bound form an aliphatic heterocycle with 4-5 carbon atoms and n is 2 or 3.

Advantageously R is hydrogen.

With particular preference $\beta$- to $\omega$-chloro- or -bromo-($C_{2-4}$-alkyl)amine is employed as compound of the formula (I').

According to the alternative ($\beta$) vinylic comonomers (Vm$_1$) that contain at least one group of the formula (I) as a constituent of the molecule are employed for the radical copolymerisation, optionally together with further vinylic comonomers (Vm$_2$) and/or (Vm$_3$).

As cationic vinylic comonomers (Vm$_3$) come advantageously into consideration such as are suitable for the production of the starting polymers of the process alternative ($\alpha$), principally such of the formula (IIIa) of which those of formulae (IV) to (VII), in particular (V) and (VI), are preferred.

As non-ionic vinylic comonomers (Vm$_2$) come advantageously into consideration such of formula (IIIb) of which those of formulae (VIII) to (XI), in particular those of formula (VIII), are preferred.

The vinylic monomers (Vm$_1$) that contain the group of formula (I) may be produced by aminoalkylation of corresponding starting vinylic monomers that contain at least one basic amino group or an acid adduct thereof, advantageously of such of formula (IIIa) and may, in particular, be represented by the formula

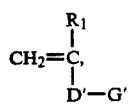 (IIIc)

wherein G' signifies the amino group of the starting monomer modified by aminoalkylation by introduction of at least one group Alk-N so as to form at least one group ($\gamma$), in particular at least one partial structure of the formula

 ($\gamma_2$), in particular the group obtainable by aminoalkylation of the group —NA'B' in compounds of the formula (IIIa).

The aminoalkylation of the starting monomers may take place, e.g. in one stage, by reaction with a compound of formula (I'), or also in two stages, by reaction of the starting monomers first with a corresponding dihalogeno($C_{2-6}$-alkane), $C_{4-6}$-di(halogeno-alkyl)ether or $C_{3-6}$-halogenoepoxyalkane and then with an amino compound, e.g. of the formula RNH$_2$, or an acid adduct thereof.

Preferred aminoalkylated vinylic monomers are those containing at least one optionally protonated —N—Alk$_1$—NH-group.

Preferred aminoalkylated vinylic monomers are, in particular, those obtainable by aminoalkylation of compounds of the formulae (IV), (V), (VI) or (VII) by introduction of radicals —Alk—NHR, especially —Alk$_1$—NHR, bound to nitrogen, in particular with formation of partial structures of the formula —N—Alk$_1$—N—Alk$_1$—NHR, optionally in protonated form, Alk, Alk$_1$ and R being as defined above.

Aminoalkylation is advantageously carried out with aminoalkylating agents, yielding a radical of the formula —Alk—NH$_2$.

If, in the vinylic copolymers of the invention, G represents the ($\gamma$)-containing amino or ammonium group obtained by aminoalkylation of a basic optionally protonated amino group by introduction of at least one optionally protonated group —Alk—NH—, the vinylic copolymers of the invention may be defined as such which advantageously contain repeating units of the formula

 (IIc)

optionally besides comonomer units of the formulae (IIa) and/or (IIb) or preferably consist essentially thereof.

Group G which signifies a basic amino-nitrogen or ammonium-nitrogen with mono- to poly-(amino-Alk)- and/or -(ammonium-Alk)-substitution each nitrogen in G being covalently bound exclusively to aliphatic and optionally heteroaromatic hydrocarbon radicals and optionally to hydrogen atoms and at least one —Alk- —NH— optionally in protonated form (i.e. as —Alk- —N⊕H$_2$—) being contained in G] is preferably such a group derived from the aminoalkylation of an optionally protonated amino group —NAB by introduction of —Alk—N— resp. —Alk—NH— or from the copolymerisation of the G'-containing monomers.

By the aminoalkylation of the basic (optionally protonated) amino groups of the starting vinylic monomers or polymers there are linked radicals —Alk—NH— to these amino groups; these radicals which in turn contain an alkylatable amino group may also be aminoalkylated depending on their reactivity and on the aminoalkylation conditions, so that by the aminoalkylation for the introduction of radicals of the formula (I) there may be formed single radicals Alk—NH, radicals Alk—N chain-extended over N, or also a ramification of aminoalkylated amino groups; thereby one or more of the following optionally repeating joints and/or ramifications may occur:

 (a)

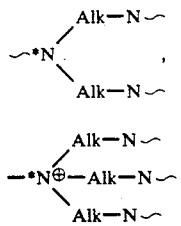 (b)

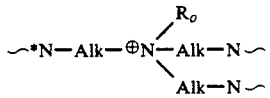 (n)

and

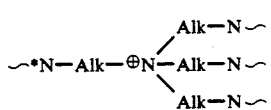 (p)

wherein the nitrogen atom designated with "*" is either a nitrogen atom of the starting monomer or polymer or a nitrogen of a neighbouring further aminoalkyl or ammoniumalkyl radical —Alk—N*~, the symbol "~" indicates the further links to hydrogen and/or other radicals as indicated above or also below, at least one basic —NH-group is present in the group G obtained by aminoalkylation and the basic nitrogen atoms are optionally protonated. Denoting with $A_o$ the significances of A or A' with the exception of hydrogen and with $B_o$ the significances of B or B' with the exception of hydrogen the possible linkages and branchings formed by aminoalkylation of the optionally protonated amino groups —NAB resp. —NA'B' may be outlined mainly as follows:

wherein $R_o$ has the significances of R with the exception of hydrogen, any alkylatable amino group —NR'— occurring in this radical being optionally also aminoalkylated, any basic nitrogen atom being optionally protonated.

Denoting with $G_o$ the radical introduced by aminoalkylation the radicals G formed by aminoalkylation of the optionally protonated amino groups

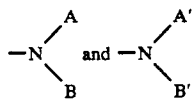

may be outlined by means of the following formulae:

—NH—Alk—N~, (d)

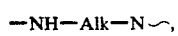 (e)

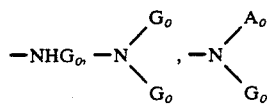

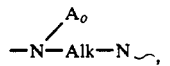 (f)

(1)   (2)   (3)

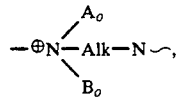 (g)

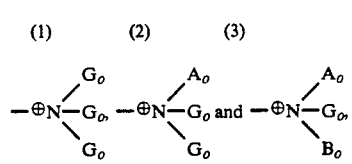

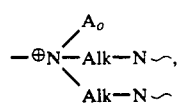

(4)   (5)   (6)

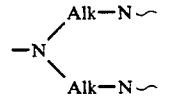 (h)

any basic nitrogen being optionally protonated.

Among the radicals (1) to (6) the radicals (3), (5) and (6) are preferred.

An anion Z⊖, in particular as defined below, is advantageously present as a counterion to the quaternary and protonated groups.

and (c)

wherein any basic nitrogen is optionally protonated.

The linkages and branchings formed by the aminoalkylation for introduction of Alk—NHR radicals may be outlined by means of the following formulae:

The groups G obtained by aminoalkylation with compounds of the formula (I') contain advantageously one or more, in particular on the average at least 2, advantageously 4 to 10 Alk₃-N-units per radical G; mainly so that at least one partial structure of the formula ~*N—Alk—NH₂, (i)

~*N—Alk—NH—Alk—N~ (j)

 (k)

N—Alk₃—N—Alk₃—NH— (γ2')

is formed per radical G resp. at least one $G_o$ in G contains such a partial structure. Alk₃ signifies therein preferably Alk₁.

~*N—Alk—NHR_o, (l)

By the two-stage aminoalkylation no more than one radical —Alk—NH— is advantageously introduced per aminoalkylatable amino group of the starting monomer.

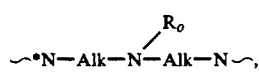 (m)

Particularly preferred aminoalkylated vinylic monomers correspond to the following formulae

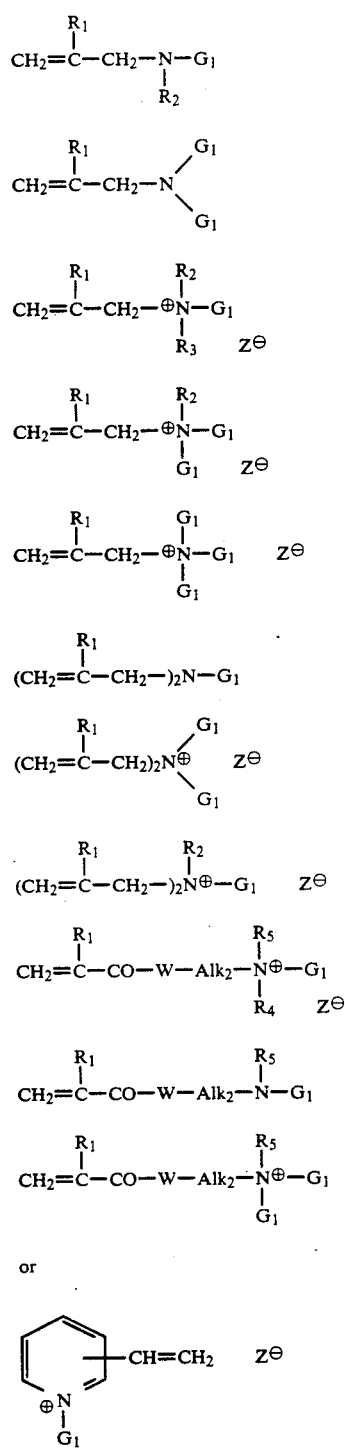
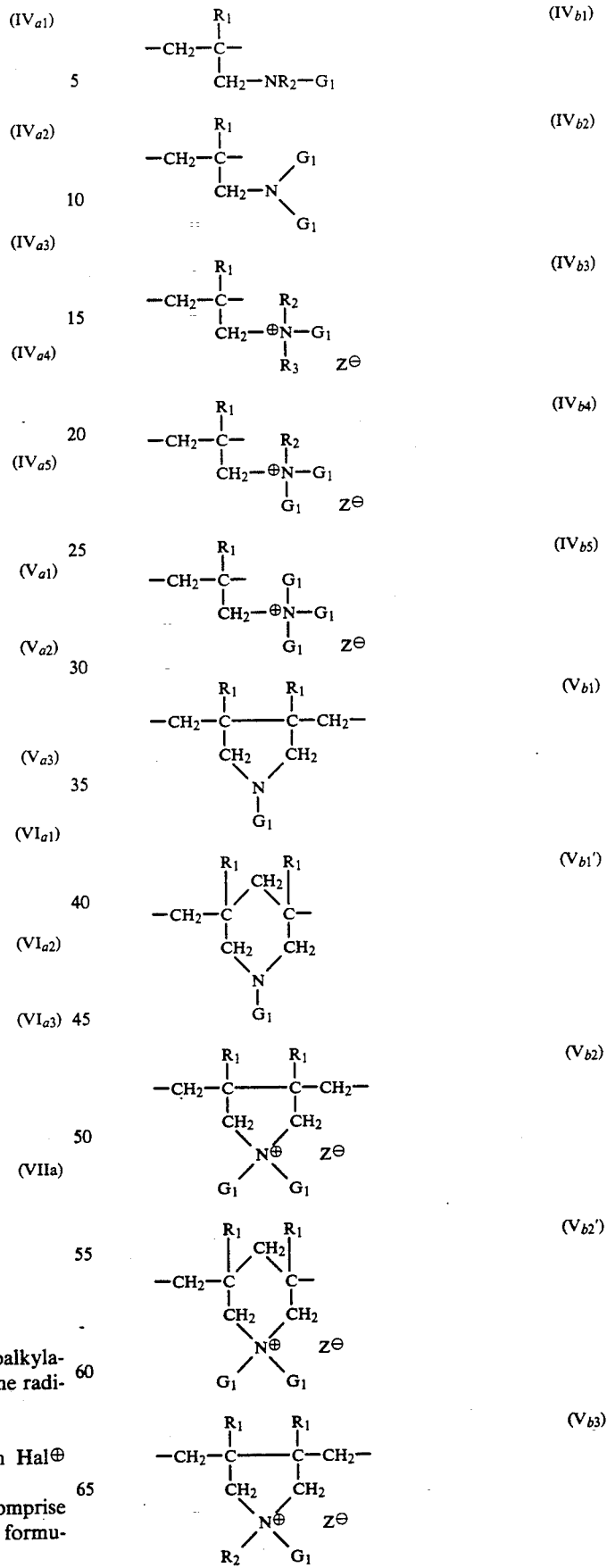

wherein $G_1$ is the radical formed by mono- or oligoaminoalkylation with an aminoalkylating agent yielding the radical $-Alk_1-NH_2$ and $Z^{\ominus}$ is a counterion, preferably $Hal^{\oplus}$ wherein $Hal^{\oplus}$ signifies preferably bromide or chloride.

The preferred copolymers of the invention comprise advantageously repeating units of the following formulae:

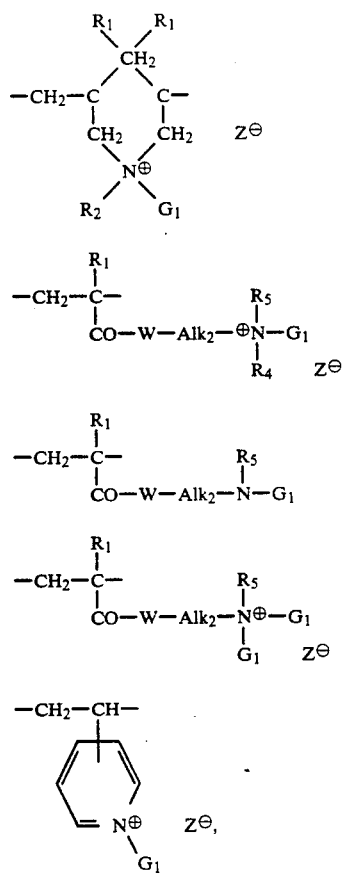

advantageously besides repeating units of the formulae

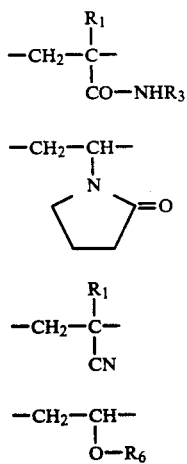

and/or of the formulae

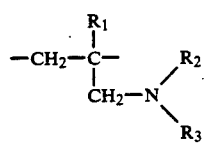

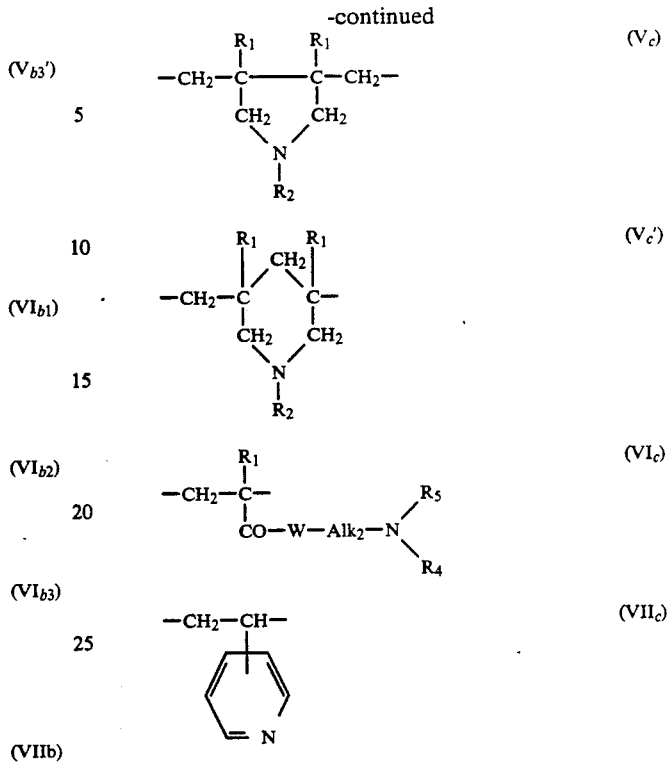

any basic nitrogen atoms occurring in the formulae (IV$_a$) to (VII) and (IV$_c$) to (VII$_c$) being optionally protonated. In the formulae (VI$_{a1}$), (VI$_{a2}$) and (VI$_{a3}$) R$_1$ signifies preferably methyl.

The polymers of the invention are vinylic copolymers comprising at least 1 mole % of ($\gamma$)-containing vinylic comonomer units as constituent units of the copolymer. They are built-up of at least two different monomer units, in particular:

of two or more different cationic ($\gamma$)-containing comonomer units, in particular corresponding to formula (IIc), or preferably of cationic ($\gamma$)-containing comonomer units, in particular corresponding to formula (IIc), and cationic comonomer units that contain no ($\gamma$)-groups, in particular corresponding to formula (IIa), or of cationic ($\gamma$)-containing comonomer units, in particular corresponding to formula (IIc), and non-ionic comonomer units, in particular corresponding to formula (IIb), or more preferably of cationic ($\gamma$)-containing and non-($\gamma$)-containing comonomer units and non-ionic comonomer units, in particular corresponding to formulae (IIa), (IIb) and (IIc).

If (IIa) is present this derives preferably from the non-exhaustive aminoalkylation of the educt for the production of (IIc).

The content of constituent ($\gamma$)-containing monomer units, in particular of the formula (IIc), is on the average principally at east Z mole %, advantageously 2 to 80 mole %, preferably at least 5 mole %, in particular 5 to 50 mole % of the total of the constituent monomer units in the copolymer. Of the aminoalkylatable amino groups of the starting monomers, advantageously 2 to 100 mole %, preferably 5 to 80 mole %, in particular 10 to 50 mole % are aminoalkylated according to the invention in the polymer, whereby the aminoalkylation may advantageously even be forced to such a degree that the amino group introduced by the aminoalkylation is in turn aminoalkylated, so that not only monoaminoalkylated but also oligo- and polyaminoalkylated amino groups are formed. The mono- and oligoaminoalkylated derivatives, in particular with at least 2, advantageously 4 to 10 Alk-N-units per built-in radical G are preferred. The non-ionic comonomer units are on the average advantageously up to 95 mole %, preferably up to 90 mole %, in particular 10–90 mole % of the total of the comonomer units in the copolymer.

For aminoalkylation it is of advantage to employ 0.5 to 10, preferably 1 to 5 moles of aminoalkylating agent, in particular of formula (I'), in total per mole of aminoalkylatable amino group of the starting polymer or of the total of the monomers.

The aminoalkylation with compounds of formula (I') takes place advantageously in aqueous medium under neutral to alkaline conditions and in the temperature range of from 30° C. to reflux temperature and may lead to the formation of chain extentions and branchings as shown above with the formulae (a) to (p) and (1) to (6).

The aminoalkylation of the starting polymers according to process alternative (α) takes place advantageously in the pH range of 7 to 10 and in the temperature rane of 30° to 100° C., preferably 40° to 60° C.; the concentration of the aqueous reaction medium is chosen advantageously so that the reaction mixture is still well stirrable, it may, however, also be rather diluted; preferably the concentration of the reaction mixture is chosen so that the dry substance content during the aminoalkylation reaction is at least 1% by weight, in particular 2 to 50% by weight, advantageously 2 to 30% by weight, preferably at least 5% by weight.

For the one-stage aminoalkylation of the monomers the temperature is chosen advantageously in the range of 40°–100° C., preferably 50°–80° C. and the pH is maintained advantageously in the range of 7-14, preferably 8-13. The concentration of the aqueous reaction medium for the aminoalkylation of the monomers may also be higher than for the aminoalkylation of the polymers, since the aqueous monomer solutions are in general not particularly viscous, and may be in particular 10-80% by weight, advantageously 30-70% by weight.

For the aminoalkylation of the monomers in two stages the reaction with the di-halogen-alkane or the di-(haloalkyl)ether is advantageously carried out in the absence of water, employing per mole of monomer at least one mole of di-halogen-alkane or di(haloalkyl)ether, preferably 5-20 moles of di-halogen-alkane or di(haloalkyl)ether; the reaction temperature is advantageously in the range of 50° C. to reflux temperature. The reaction of the starting monomers with the halogen epoxy alkane is advantageously carried out in the molar ratio of 1:0.8 to 1:1, either in the absence of water, advantageously at temperatures in the range of 20°–50° C., or in aqueous strongly acidic medium, in particular at pH 1-3, advantageously at temperatures in the range of 80°–100° C. The further reaction with ammonia or an amine is carried out advantageously by employing 5–10 moles of ammonia or, amine per mole of halogen to be reacted and in the absence of water or any other solvent and advantageously at temperatures in the range of 20°–60° C. The addition of an amino compound to an epoxy group is carried out advantageously under the conditions described above.

In the aminoalkylation of monomers of formula (VI) R signifies preferably methyl.

By means of the two-stage aminoalkylation there is introduced principally no more than one radical of formula (I) in particular no more than one radical Alk-N per aminoalkylatable amino group of the monomer.

The polymerisation reaction according to the process alternative (β) may take place in general under conventional polymerisation conditions as used for the production of vinylic polymers, preferably in solution in particular in aqueous solution, advantageously at temperatures in the range of 20°–100° C., preferably 40°–80° C., and under acidic conditions, advantageously at pH 1–5, preferably 2–4, expediently in the presence of a suitable polymerisation initiator and advantageously at such concentrations that the reaction mixture is still well stirrable, even after completion of the polymerisation, in particular at concentrations of at least 2% by weight of dry substance content, preferably at least 5% by weight of dry substance content in the aqueous reaction mixture. A polymerisation regulator (chain-transfer agent) may be employed, if desired.

As polymerisation initiators there may be employed e.g. such that by thermal decomposition form free radicals, or also a redox system. Particularly preferred are initiators of the azo series, especially those containing a group with cationic nitrogen, preferably such of the formula

$$(R_9{-}N{=}N{-}R_{10})^{\oplus}L^{\ominus} \qquad (XIII)$$

in which $R_9$ and $R_{10}$, independently from each other, represent a radical selected from the group consisting of alkyl, aryl, alkaryl, aralkyl, cyanoalkyl, cyanoaryl, cyanoalkaryl or cyanoaralkyl, which may be substituted and at least one of them contain a cationized nitrogen atom or $R_9$ and $R_{10}$ together form a bivalent radical, selected from the group consisting of alkylene, alkylalkylene or arylalkylene, that are substituted and contain at least one cationized nitrogen atom, and $L^{\ominus}$ signifies an anion.

Initiators of the above formula wherein at least one of the radicals $R_9$ and $R_{10}$ signify a member selected from the group consisting of protonated derivatives of the following radicals: aminoalkyl, aminoaryl, amidinoalkyl, amidinoaryl, aminoalkaryl, aminoaralkyl, amidinoalkaryl, amidinoaralkyl, cyanaminoalkyl or cyanaminoalkaryl are particularly preferred.

Examples of these preferred initiators are 2,2'-azo-bis-(amidinopropane)dihydrochloride, 2,2'-azo-bis(2-amidinobrutane)dihydrochloride, 2,2,-azo-bis(N-phenylamidino-propane)dihydrochloride, 2,2'-azo-bis(N,N-dimethylamidinopropane)dihydrochloride, 2,2'-azo-bis(N-hydroxyethylamidinopropane)dihydrochloride and 2,2'-azo-bis[2-(imidazolinyl)propane]dihydrochloride.

These initiators are advantageously employed in concentrations of 0.2 to 10% by weight referred to the weight of the employed monomers. Preferably they are employed in amounts of 0.7 to 7.0% by weight.

The chain-transfer agents may be any conventional compounds, e.g. low molecular hydrosoluble mercapto compounds, e.g. mercapto-ethanol, or an alkanol, e.g. isopropanol, or further, phosphorous acid. These chain-transfer agents are advantageously employed in amounts of 0.01 to 10% by weight, preferably 0.05 to 5% by weight, referred to the weight of the employed monomers.

The polymerisation takes advantageously place in the absence of atmospheric oxygen, preferably under a nitrogen blanket.

The average molecular weight (weight average) of the copolymers of the invention may range in a broad scope, advantageously in the scope of 100,000 to 20,000,000, preferably 500,000 to 90,000,000.

For setting acid pH values and in particular for the production of the protonated products (acid adducts) any acids conventional per se may be employed. The acid adducts may be formed by addition of any conventional, preferably low molecular acids as are usually employed to protonate amines in order to produce hydrosoluble ammonium salts, principally simple mineral acids, including hydrochloric acid, hydrobromic acid, sulphuric acid or phosphoric acid or low molecular aliphatic carboxylic acids, preferably with 1 to 4 carbon atoms, including formic acid, acetic acid, oxalic acid and lactic acid. The counterion $Z^\ominus$ may, thus, also correspond to the anion of these acids or be an anion resulting from the quaternating aminoalkylation, which is preferably a halide, in particular chloride or bromide. For setting particularly low pH values, e.g. as indicated above, it is preferred to employ stronger mineral acids, in particular hydrochloric acid or sulphuric acid. For setting strongly basic pH-values, it is preferred to employ alkali metal hydroxides (including KOH or NaOH). In order to avoid cross-linkings in the presence of primary carbamoyl groups, it is of advantage to add subsequently ammonium salts or strong mineral acids, in particular ammonium chloride or sulphate.

The copolymers produced as described, may, if desired, be isolated from the reaction mixture; since the copolymers may be employed directly in aqueous medium; so as they have been produced, it is preferred not to isolate them from the mother lye but to employ them directly so as they have been produced. The aqueous concentrated composition, in particular with 2–50, preferably 5–30 weight % dry substance content, show a good storage stability.

The cationic copolymers of the invention are dilutable with water, i.e. they distribute homogeneously in water to form at least colloidal, in particular true aqueous solutions. They are, in particular, polyelectrolytes of polycationic character and are essentially free of anionic monomer units as constituent units of the polymer, a small portion of eventual carboxy groups, principally less than 3 mole %, advantageously less than 1 mole %, preferably not more than 0.2 mole %, deriving from a possible hydrolysis of occurring amide groups as a secondary reaction, being tolerable, any anionic monomer units optionally present due to a possible hydrolysis being in any case present in a smaller molar portion than the cationic monomer units. The side-chain-containing copolymers of the invention are, in particular, essentially non-cross-linked and their backbone (hydrocarbon chain) is substantially linear. They can be employed in all technical fields in which cationic hydrosoluble polymers are used; they are in particular suitable as precipitation and flocculation agents and can be employed for the purification of water and back-water and for the dehydration of backwater sludges; they are particularly distinguished by their outstanding retention and dehydration properties and are thus advantageously employable as retention and dehydration agents, preferably in the weakly basic to nearly neutral range (in particular pH 6.5 to 8) for the production of shaped structures of cellulosic fibres and/or cellulosic pulp. The invention, thus, further provides the use of the products of the invention as precipitation and flocculation agents, preferably as retention and dehydration agents for the production of shaped structures of cellulosic fibre and/or pulp, mainly cardboard and paper; further, they are also well suitable as flocculating agents for aqueous sludges, in particular digested sludge and fresh sludge of municipal waste-water treatment plants. Further the invention provides also a process for the production of shaped structures of cellulosic fibres resp. pulp, in particular cardboard and preferably paper, wherein a product of the invention is employed as retention and/or dehydration agent.

A particularly homogeneous sheet formation may be observed in the production of paper, in particular in the continuous production of paper webs employing the products of the invention.

The required (resp. optimum) concentration of copolymer for each application depends of course on the kind and concentration of the dissolved or dispersed, in particular suspended substances that are to be treated. For flocculation pH-value may range in conventional scopes, mainly in the weakly alkaline to acidic range, depending on the field of use (preferably nearly neutral) especially pH 4–8, advantageously 5 to 7.5, for paper preferably 6.5 to 8.

In the following examples the parts and percentages are by weight, if not otherwise indicated; the temperatures are in degrees Celsius. Parts by weight relate to parts by volume as grams to ml. The viscosities are measured at 20° C.

EXAMPLE 1

34 parts of dimethylaminopropyl-methacrylamide, 26 parts of 1-amino-2-chloropropane hydrochloride and 50 parts of water are mixed and are combined at room temperature, with stirring, with 26.67 parts of an aqueous 30% sodium hydroxide solution. The mixture is then heated to 60° C. within 30 minutes and stirring is continued for one hour at this temperature. 500 parts of water are then added and the pH is set to 2.8 by means of aqueous 30% hydrochloric acid. Subsequently there are added 58 parts of acrylamide and so much water that there are obtained in total 1216 parts of monomer-containing solution. 0.9 parts of 2,2'-azo-bis(2-amidinopropane)-dihydrochloride are now added and the obtained solution is freed of air by means of a strong nitrogen stream. After 30 minutes the nitrogen feed is diminished, the reaction mixture is heated to 60° C. and maintained at this temperature for 15 hours. Thereupon it is cooled to room temperature (=20° C.) and discharged. There are obtained 1216 parts of a highly efficient retention and dehydrating agent for paper production. The viscosity of the product is 2900 cP. (spindle no. 4, 60 rpm).

EXAMPLE 2

136 parts of dimethylaminopropyl-methacrylamide and 400 parts of water are mixed and the pH is adjusted to 2.8 with 80 parts of aqueous 36% hydrochloric acid. 227.2 parts of acrylamide and a quantity of water sufficient to form 1600 parts of solution are then added. After checking that the pH is still 2.8, 3 parts of a 10% solution of mercaptoethanol in isopropanol are added thereto as polymerisation regulator. The obtained solution is freed of air by means of a strong nitrogen stream with stirring and is heated to 60° C., during which dropwise addition thereto of a solution of 7.2 parts of 2,2'-azo-bis(2-amidinopropane)dihydrochloride in 152.8 parts of water is started. This dropwise addition lasts 10 hours. Thereupon polymerisation is allowed to complete for further 10 hours at 60° C. under nitrogen, it is then cooled to 40° C. and combined with 92.8 parts of 2-chloroethylamine hydrochloride. 212.8 parts of an aqueous 30% sodium hydroxide solution are then added and the temperature is again raised to 60° C. and after 3 hours at 60° C., the mixture is cooled to room temperature. The viscosity is 9100 cP (Brookfield viscosimeter, spindle no. 4, 60 rpm) and the pH is 9.5. 445 parts of ammonium chloride and 1600 parts of water are added and the pH is adjusted to 2.0 by means of 36% hydrochloric acid. There is obtained a storage stable highly efficient retention and dehydration agent for the paper industry, with a Brookfield viscosity of 500 cP (spindle no. 4, 60 rpm).

EXAMPLE 3

68 parts of dimethylaminopropyl-methacrylamide, 54.1 parts of water and 46.4 parts of 2-chloroethylamine hydrochloride are mixed and combined at room temperature, with cooling, with 53.66 parts of an aqueous 30% sodium hydroxide solution. The mixture is heated within 30 minutes to 95° C. and stirring is continued for one hour at this temperature. 1000 parts of water and 116 parts of acrylamide are then added and the pH is adjusted to 2.8 by means of aqueous 36% hydrochloric acid, there being obtained by addition of little water 2050 parts of monomer-containing solution. 6 parts of phosphorous acid and 1.8 parts of 2,2'-azobis(2-amidinopropane)dihydrochloride are then added, the mixture is purged with nitrogen and the temperature is raised to 60° C. After 15 hours there is measured a Brookfield viscosity of 1500 cP (spindle no. 4, 60 rpm). After cooling to room temperature 236.7 parts of ammonium chloride are added, the pH is adjusted to 2.0 with 36% hydrochloric acid and there is added so much water that there are obtained 2367 parts of product. The viscosity is then 1000 cP (Brookfield, spindle no. 4, 60 rpm). The product is a storage-stable, efficient retention and dewatering agent for paper production.

EXAMPLE 4

12.13 parts of diallylamine and 21.25 parts of dimethylaminopropylmethacrylamide are mixed with 25 parts of water and treated at room temperature, with cooling, with 51.23 parts of 2-aminoethylbromide hydrobromide and 33.33 parts of an aqueous 30% sodium hydroxide solution. The mixture is then heated to 60° C. and maintained 5 hours at this temperature to allow the reaction to complete. The pH is then adjusted to 2.5 with 36% hydrochloric acid. Thereupon there are added 72.5 parts of acrylamide and so much water that there are obtained 1311 parts of monomer-containing solution. The mixture is then purged with nitrogen and heated to 60° C. and then is started the dropwise addition of 62 parts of a solution of 9 parts of 2,2'-azobis(2-amidinopropane)-dihydrochloride in 52 parts of water. The dropwise addition lasts 10 hours. The reaction is allowed to complete for further 9 hours at 60° C., then the mixture is cooled to room temperature and is discharged. There is obtained a highly efficient retention and dehydration agent for paper production.

EXAMPLE 5

Example 4 is repeated using the following components:
12.13 parts of diallylamine
21.25 parts of dimethylaminopropyl-methacrylamide
102.45 parts of 2-aminoethylbromide-hydrobromide
66.66 parts of aqueous 30% sodium hydroxide solution
50.00 parts of water
72.50 parts of acrylamide
such an amount of water, that there are obtained 1,438 parts of monomer-containing solution
61.00 parts of initiator solution [9 parts of 2,2'-azobis-(2-amidinopropane)dihydrochloride in 52 parts of water.

EXAMPLE 6

625 parts of an aqueous 30% sodium hydroxide solution are added during one hour to a mixture of 1258 parts of an aqueous 36.2% diallylamine solution and 1010 parts of an aqueous 53.8% chloroethylamino hydrochloride solution, by which the temperature increases to 60° C. Stirring is continued for 2 hours at this temperature and completion of the reaction is checked (chlorine ions titration). The reaction mixture is then cooled to room temperature. 289 parts of the obtained solution, 133 parts of acrylamide and 1792.7 parts of water are mixed and neutralized with 57 parts of 30% hydrochloric acid and the obtained solution is purged with nitrogen. After heating to 60° C. dropwise addition of 2.3 parts of 2,2'-azobis(2-amidinopropane)-dihydrochloride in 27 parts of water is started. The dropwise addition lasts for 8 hours. Polymerisation is allowed to complete for 7 hours at 60° C. and the reaction mixture is then cooled and discharged. There are obtained 2301 parts of a clear yellow solution with an active substance content of 9.4% (referred to the free base). The product is a highly efficient retention and dehydration agent for paper production.

APPLICATION EXAMPLE A1

An aqueous 2% paper slurry of the following solid substance composition is used:
50 parts of bleached sulphite pulp
50 parts of bleached beech pulp
30 parts of kaolin
3 parts of resin size
2 parts of aluminium sulphate.

125 ml of the slurry are mixed with 5 resp. 10 ml of an aqueous 0.05% solution of the product described in Example 1 and 875 ml of dilution water before sheet formation. After stirring 5 sec. at 250 rpm the mixture is transferred into the filling chamber of a sheet former (Rapid-Köthen-System) containing 3 1 of water. After a 20 sec. pause the sheet is formed by operating the suction valve. There is obtained a paper with very high filler retention.

APPLICATION EXAMPLES A2 TO A6

The procedure described in Application Example A1 is repeated with the difference that in place of the product of Example 1 the same quantity of the products of Examples 2, 3, 4, 5 resp. 6 is employed.

APPLICATION EXAMPLE B1

An aqueous 2% paper slurry of the following solid substance composition is employed:
100 parts of bleached sulphite pulp 20 parts of calcium carbonate. 125 ml of the slurry are taken from the slurry stock and mixed with a commercially available synthetic size emulsion (emulsion of a dimeric alkyl ketene) before sheet formation on the Rapid-Köthen sheet-former. 5-15 ml of an aqueous 0.05% solution of the stock dilution of the product described in Example 1 and 875 ml of dilution water are then added to the mixture. After stirring 5 seconds at Z50 rpm the aqueous mixture is transferred into the filling chamber of a sheet former (Rapid-Köthen-System) already containing 3 l of water. After a pause of 20 seconds the sheet is formed by operating the suction valve. The produced paper is distinguished by its high filler retention.

APPLICATION EXAMPLES B2 TO B6

The procedure of Application Example B1 is repeated with the difference that in place of the product of Example 1 the same quantity of the products of Examples 2, 3, 4, 5 resp. 6 is employed.

APPLICATION EXAMPLE C1

250 ml of a 2% suspension of recycled-paper-containing pulp of the following solid substance composition:
25 parts of mechanical pulp
25 parts of newspapers
25 parts of cardboard (grey)
25 parts of corrugated paste board
5 parts of kaolin
are mixed 20 seconds before the test with 875 ml of water that contain 2.5 to 15 ml of an aqueous 0.2% solution of the product described in Example 1 and directly dewatered on a Schopper-Riegler apparatus. The time required for the efflux of a determined quantity of filtrate from the suspension serves as the measure for the flocculating efficiency. (The employed test method is described in Merkblatt V 17/61 of "Verein der Zellstoff- und Papier-Chemiker und -Ingenieure"). The dewatering is clearly accelerated by the presence of the product described in Example 1.

APPLICATION EXAMPLES C2 TO C6

The procedure described in Application Example C1 is repeated with the difference that in place of the product on Example 1 the same quantity of the products of Examples 2, 3, 4, 5 resp. 6 is employed.

I claim:

1. A cationic, water-dilutable, side-chains-containing vinylic copolymer which is characterised by containing a group ($\gamma$) of the formula $$-X-Alk-Y- \qquad (I),$$

wherein
Alk signifies alkylene with 2-6 carbon atoms, hydroxy-substituted alkylene with 3-6 carbon atoms or alkylene with 4-6 carbon atoms interrupted by oxygen,
X signifies a basic amino group or an ammonium group and
Y signifies a basic —NH— group or an acid adduct thereof,
the one of X and Y being further linked to an optionally substituted aliphatic or hetero-aromatic hydrocarbon radical and the other being further linked to hydrogen or to an optionally substituted aliphatic hydrocarbon radical, as a constituent of at least some of the side-chains extending from the main chain, at least 1 mole % of the comonomer-units constituting the copolymer bearing such a ($\gamma$)-containing side-chain.

2. A copolymer according to claim 1 essentially consisting of repeating comonomer units of the formula

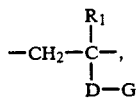
(IIc)

optionally besides comonomer units of formula

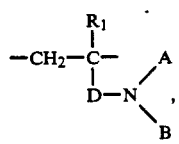
(IIa)

and/or of formula

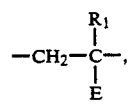
(IIb)

wherein
$R_1$ signifies hydrogen or methyl,
A and B independently from each other signify hydrogen or an aliphatic, araliphatic or heteroaromatic substituent which is bound to the N-atom through an aliphatic or heteroaromatic links the basic amino group to the
D signifies a group that links the basic amino group to the main chain, optionally with inclusion of A and optionally B to form a heterocycle,
E signifies a non-ionic substituent, and
G signifies a basic amino nitrogen or ammonium nitrogen with mono- to poly-(amino-Alk)- and/or -(ammonium-Alk)-substitution, each nitrogen in G being covalently bound exclusively to aliphatic and optionally heteroaromatic hydrocarbon radicals and optionally to hydrogen atoms, and at least one —Alk—NH— optionally in protonated form being contained in G any basic amino groups occurring in formulae (IIa) and (IIc) being optionally protonated.

3. A copolymer according to claim 1 in aqueous solution or dispersion.

4. The cationic vinylic copolymer of claim 1 wherein the constituent ($\gamma$)-containing monomer units comprise 5-50 mole % of the total monomer units of the copolymer.

5. A copolymer according to claim 2 having an average molecular weight of 500,000 to 10,000,000.

6. A copolymer according to claim 2 which contains less than 3 mole % carboxyl groups.

7. A copolymer according to claim 2 which is essentially free of anionic monomer-units as constituent units of the copolymer.

8. A copolymer according to claim 2 which is essentially non-cross-linked and wherein the main chain is substantially linear.

9. A copolymer according to claim 3 which comprises 5-30 weight % (based on dry weight) of the aqueous solution or dispersion.

10. A cationic, water-dilutable vinylic copolymer characterized in that at least 1 mole % of the monomeric-units constituting the copolymer are aminoalkylated monomer-units selected from the group consisting of units having the formulae:

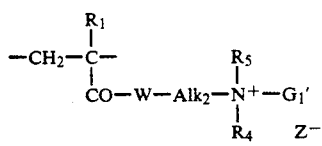 (VI$_{b1}$)

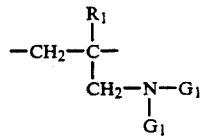 (IV$_{b2}$)

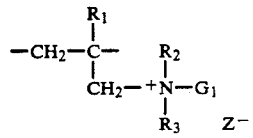 (IV$_{b3}$)

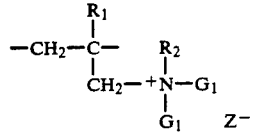 (IV$_{b4}$)

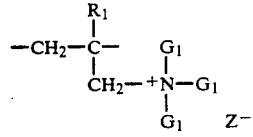 (IV$_{b5}$)

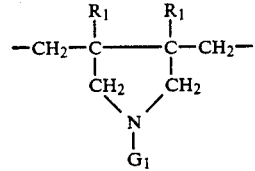 (V$_{b1}$)

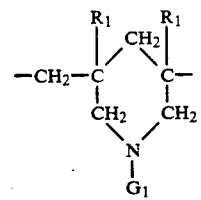 (V$_{b1}'$)

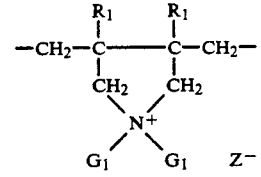 (V$_{b2}$)

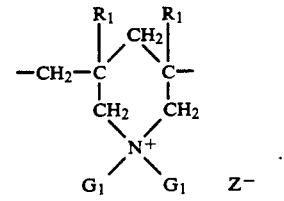 (V$_{b2}'$)

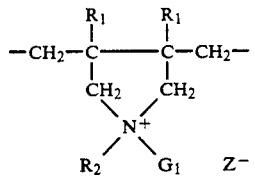 (V$_{b3}$)

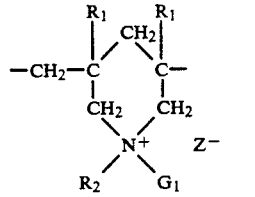 (V$_{b3}'$)

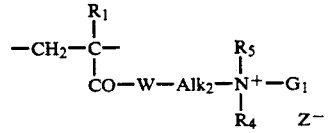 (VI$_{b1}$)

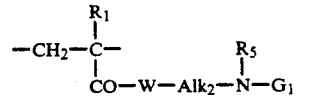 (VI$_{b2}$)

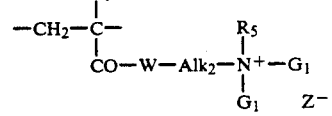 (VI$_{b3}$)

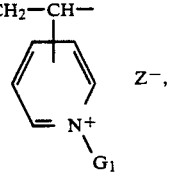 (VII$_b$)

wherein $G_1$ is a radical derived from mono- or oligoaminoalkylation of an aminoalkylatable amino group, said $G_1$ containing at least one radical —Alk—NH—, the nitrogen being optionally protonated, Alk signifies $C_{2-6}$alkylene, hydroxy-substituted $C_{3-6}$alkylene, or $C_{4-6}$alkylene interrupted by oxygen, $R_1$ independently from each other signifies hydrogen or methyl, $R_2$ independently from each other signifies hydrogen, $C_{1-8}$alkyl or benzyl, $R_3$ independently from each other signifies H or $C_{1-2}$alkyl, $R_4$ signifies H or $C_{1-2}$alkyl, $R_5$ signifies $C_{1-6}$alkyl, Alk$_2$ signifies $C_{2-6}$alkylene or hydroxy-substituted $C_{3-6}$alkylene, and W signifies —O— or —NH—, $Z^-$ is a counterion.

11. A copolymer according to claim 10 which consists essentially of one or more of said aminoalkylated monomer-units and one or more units selected from the group consisting of monomer-units of the following formulae:

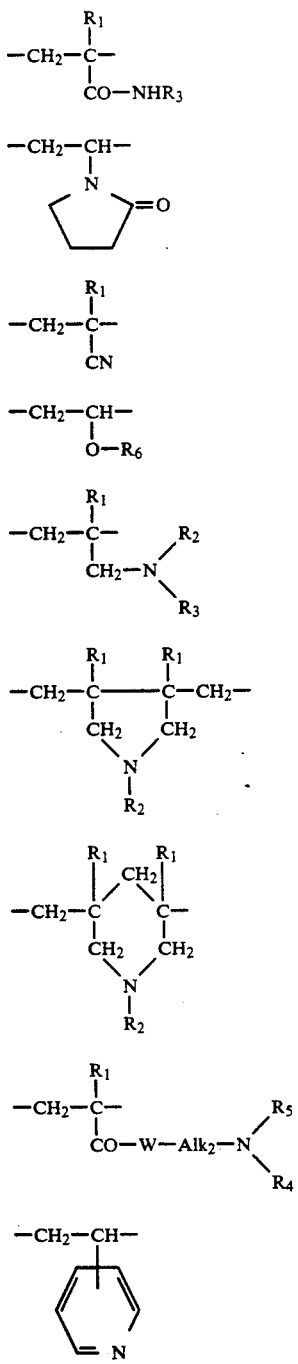

wherein

G₁, Alk₂, W, Z⁻, R₁, R₂, R₃, R₄ and R₅ have the significances previously recited, and R₆ is $C_{1-2}$ alkyl.

12. A copolymer according to claim 11 wherein Alk is selected from ethylene, propylene-1,2, propylene-1,3, butylene-1,2, and butylene-1,4.

13. A copolymer according to claim 12 wherein one or more aminoalkylated monomer-units has a formula selected from $IV_{b1}$-$V_{b5}$, $V_{b1}$-$V_{b3}$, $V_{b1'}$-$V_{b3'}$ and $VI_{b1}$-$VI_{b3}$.

14. A copolymer according to claim 13 which additionally comprises one or more monomer-units having formula $VIII_b$.

15. A copolymer according to claim 12 which consists essentially of one or more monomer-units having formulae $VI_{b1}$-$VI_{b3}$, and one or more monomer-units having formula $VIII_b$.

16. A copolymer according to claim 15 wherein in formulae $VI_{b1}$-$VI_{b3}$, Alk₂ is —C₃H₆—; W is —NH—; and R₄ and R₅ are methyl; in formula $VIII_b$, R₁ is CH₃; Z— is a halogen, and G₁ comprises —C₂H₄—NH— or —C₃H₆—NH—.

17. A copolymer according to claim 14 wherein in formulae $V_{b1}$-$V_{b3}$ and $V_{b1'}$-$V_{b3'}$ R₁ is H.

18. A copolymer according to claim 11 having an average molecular weight of 100,000 to 20,000,000.

19. A copolymer according to claim 11 which contains not more than 0.2 mole % carboxyl groups.

20. A copolymer according to claim 11 which is essentially free of anionic monomer-units as constituent units of the copolymer.

21. A copolymer according to claim 11 which has an average molecular weight of 100,000 to 20,000,000, is substantially linear and non-cross-linked, and is essentially free of anionic monomer-units as constituent units of the copolymer.

22. A copolymer according to claim 11 which is derived from polymerization of (1) an aminoalkylation reaction product obtained by reacting at 40°–100° C. at pH of 7–14, dimethylaminopropylmethacrylamide with an aminoalkylating agent yielding a 1-aminopropyl radical, said aminoalkylating agent being employed in an amount of 0.5 to 10 moles per mole of dimethylaminopropylmethacrylamide, with (2) acrylamide, said polymerization reaction being carried out in aqueous solution at 20°–100° C. at pH 1–5.

23. A copolymer according to claim 11 which is derived from polymerization of dimethylaminopropylmethacrylamide and acrylamide in aqueous solution at 20°–100° C. at pH 1–5, followed by aminoalkylation of the resulting polymer, at 40°–100° C. at pH 7–14, with an aminoalkylating agent yielding an aminoethyl radical, wherein the aminoalkylating agent is employed in an amount of 0.5 to 10 moles per mole of aminoalkylatable amino group of the polymer.

24. A copolymer according to claim 11 which is derived from polymerization of (1) an aminoalkylation reaction product of dimethylaminopropylmethacrylamide with an aminoalkylating agent yielding an aminoethyl radical, wherein the aminoalkylating agent is employed in an amount of 0.5 to 10 moles per mole of dimethylaminopropylmethacrylamide, at 40°–100° C. at a pH of 7–14, with (2) acrylamide, said polymerization reaction being carried out in aqueous solution at 20°–100° C. at pH 1–5.

25. A copolymer according to claim 11 which is derived from polymerization of (1) an aminoalkylation reaction product of diallylamine and dimethylaminopropylmethacrylamide with an aminoalkylating agent yielding an aminoethyl radical, wherein the aminoalkylating agent is employed in an amount of 0.5 to 10 moles per mole of aminoalkylatable amino groups, at 40°–100° C. at pH 7–14, with (2) acrylamide, said polymerization reaction being carried out in aqueous solution at 20°–100° C. at pH 1–5.

26. A copolymer according to claim 1 which is derived from polymerization reaction of (1) an aminoalkylation product of diallylamine and an aminoalkylating agent yielding an aminoethyl radical, the aminoalkylating agent being employed in an amount of 0.5 to 10 moles per mole of diallylamine, at 40°-100° C. at pH 7-14, with (2) acrylamide, said polymerization reaction being carried out in aqueous solution at 20°-100° C. at pH 1-5.

27. A copolymer according to claim 11 wherein 10-50 mole % of the aminoalkylatable amino groups of the comonomer-units are aminoalkylated.

* * * * *